United States Patent [19]
Cook et al.

[11] 3,932,027
[45] Jan. 13, 1976

[54] BEAM SPLITTING PRISM ASSEMBLY

[75] Inventors: Gordon Henry Cook; John Anthony Fawcett, both of Leicester, England

[73] Assignee: The Rank Organisation Limited, London, England

[22] Filed: Dec. 11, 1974

[21] Appl. No.: 531,781

[30] Foreign Application Priority Data
Dec. 11, 1973 United Kingdom............ 57285/73

[52] U.S. Cl. ............................................. 350/173
[51] Int. Cl.² ....................................... G02B 27/10
[58] Field of Search .................................. 350/173

[56] References Cited
UNITED STATES PATENTS
3,802,763  4/1974  Cook et al. .................... 350/173

Primary Examiner—David H. Rubin
Attorney, Agent, or Firm—Brisebois & Kruger

[57] ABSTRACT

A four-element composite prism assembly for splitting an incident beam into three colour components, the first and second pairs of elements being separated by respective air gaps, and colour separation occurring at respective spectrally selective dichroic coatings between the second and third and the third and fourth prism elements respectively, the separated colour components being directed in different directions by total internal reflection at the air gaps. To achieve the optimum separation upper and lower limits are defined in the claims for the apex angles of the three prism elements.

5 Claims, 5 Drawing Figures

BEAM SPLITTING PRISM ASSEMBLY

The invention relates to a beam splitting prism assembly having the function of spectrally and spatially separating incident white light into three colour components. In particular the invention refers to such prism assemblies intended to be positioned within the image forming rear conjugate distance of a camera objective so that the camera objective forms three differently coloured primary images on three separate detectors.

FIG. 1 of the accompanying drawings shows one known three-element prismatic beam splitter arrangement of the above-described type which has been utilised for many years. As shown by the ray paths illustrated in FIG. 1 some of the optical surfaces of the prism assembly operate in dual modes (both reflective and transmissive) because they are utilised more than once in the optical train, whilst others carry dichroic coatings providing simultaneously high reflectance at one part of the spectrum and high transmittance at other parts.

Regardless of the manner in which any of the three prism elements shown in the prism assembly of FIG. 1 may be compounded, for example, by the replacement of part of each prism by glass filters finely trimming the spectral response of each channel, the assembly may nevertheless be categorised as a three-element prism assembly.

In the known three-element prism assembly shown in FIG. 1, the geometrical layout necessarily has to conform to a number of optical constraints. Of particular importance are the dual modes of some of the surfaces where the transmittance mode requires the incidence of light on the surface at angles less than the critical angle of reflection and the reflectance mode requires the incidence of light on the surface at angles greater than the critical angle of reflection, for all directions of the image forming light emanating from the camera objective. It is apparent that choice of angular construction in an assembly of this type is severely limited and that the angles of incidence at the first dichroic surface are necessarily large.

It is also well known that the larger the nominal angle of incidence the more serious become the spectral sensitivities to angular variation of direction of the image forming light and to the degree of polarisation in the incident light.

Since the effects are complementarily present in the reflected as well as the transmitted components, spectrally adjacent colour channels are affected in a differential balance sense and the number of channels affected depends on the choice of the colour to be reflected first.

Such previously known prism assemblies therefore present serious difficulty in high quality applications such as broadcast colour television where faithful colour rendering under all conditions is a prime requirement.

An object of this invention is to provide an improved beam-splitting prism assembly in which the adverse spectral effects of polarisation and colour shading are significantly reduced without impairment of other desirable features such as compactness of overall layout, freedom from ghost images and optical compatibility with known camera objectives.

It has been found that a four element prism provides conditions in which the angles of incidence at the first dichroic surface can be reduced to a very significant extent and in which the relationship between all the angles of the prism elements is such that the total glass path length can be substantially the same as that of a comparable three element prism without the introduction of ghost image hazards or impracticable camera layout requirements.

According to the present invention there is provided a beam-splitting prism assembly comprising four prism elements arranged to separate incident light spatially into three different spectral components wherein the first component lies spectrally between the other two components; in which the first and second prism elements, considered in the direction of incident light, have adjacent parallel and spectrally substantially non-selective surfaces defining a first air gap, the second and third prism elements are separated by a second air gap bounded by a first spectrally selective dichroic coated surface and a spectrally substantially non-selective parallel surface, one of the adjacent surfaces of the third and fourth prism elements carrying a spectrally selective second dichroic coating; in which the surfaces defining the first and second air gaps are appropriately inclined to the axis of incident light to transmit the incident light and to totally internally reflect the light which has been selectively reflected from the corresponding dichroic surface, and in which the apex angles of the first three prism elements lie within the following limits:

$$\frac{6\left[\sin^{-1}\left(\frac{1}{N}\right) + \sin^{-1}\left(\frac{1}{2f_oN}\right)\right]}{5} > (2B-A) \geq \left[\sin^{-1}\left(\frac{1}{N}\right) + \sin^{-1}\left(\frac{1}{2f_oN}\right)\right]$$

$$\frac{6\left[\sin^{-1}\left(\frac{1}{N}\right) + \sin^{-1}\left(\frac{1}{2f_oN}\right)\right]}{5} > (2C-B+A) \geq \left[\sin^{-1}\left(\frac{1}{N}\right) + \sin^{-1}\left(\frac{1}{2f_oN}\right)\right]$$

$$\frac{5\left[\sin^{-1}\left(\frac{1}{N}\right) - \sin^{-1}\left(\frac{1}{2f_oN}\right)\right]}{6} > A > \frac{\left[\sin^{-1}\left(\frac{1}{N}\right) + \sin^{-1}\left(\frac{1}{2f_oN}\right)\right]}{3}$$

$$\frac{4\left[\sin^{-1}\left(\frac{1}{N}\right) - \sin^{-1}\left(\frac{1}{2f_oN}\right)\right]}{3} \geq B > \frac{2\left[\sin^{-1}\left(\frac{1}{N}\right) + \sin^{-1}\left(\frac{1}{2f_oN}\right)\right]}{3}$$

$$\frac{5\left[\sin^{-1}\left(\frac{1}{N}\right) - \sin^{-1}\left(\frac{1}{2f_oN}\right)\right]}{4} \geq C > \frac{5\left[\sin^{-1}\left(\frac{1}{N}\right) + \sin^{-1}\left(\frac{1}{2f_oN}\right)\right]}{8}$$

where:

$A$ is the apex angle of the first prism element;
$B$ is the apex angle of the second prism element;
$C$ is the apex angle of the third prism element;

$N$ is the refractive index of the prism glass at the wavelength appropriate to the colour being selected;

$fo$ is the widest relative aperture of camera objective with which the assembly is optically compatible.

Optimisation of the apex angles of the prism elements and their interdependancies results in a significant reduction of angle of incidence at the first dichroic surface compared with the prior art. Previously a high angle of incidence at the first dichroic surface has created conditions which impair polarisation and colour shading performance regardless of the choice of order of colour separation and only compromise solutions were available in which spectral errors were inevitable in at least two colour channels no matter which order is chosen.

In comparison the low angle of incidence at the first dichroic surface made possible by the present invention can be utilised to provide enhanced performance. By selecting the spectrally central one of the three colour channels to be separated first, significant advantages can be obtained in all three channels to fulfil all the objects of the invention simultaneously.

Separation of a first channel such as green in this way effectively satisfies the requirements for this colour component and enables the red and blue components to be separated by the second dichroic surface in conditions of minus green. The spectral cut-off edge required for the second separation may be sited well away from the red and blue channels so that spectral edge shifts due to polarisation and variation of angle of incidence at the red/blue separation do not affect the shapes or peak efficiencies of the red and blue components. Furthermore, and in contrast with the prior art, the angle of incidence at the second dichroic surface is only of secondary importance and can be utilised to optimise other aspects of geometry without spectral sacrifice.

It is well known in the art that use of a green reflecting dichroic surface facilitates the application of thin film design techniques which further reduce the adverse effects described and which reduce the necessity of highly subtractive trimming filters.

The invention will now be described, by way of example, with reference to FIGS. 2 to 5 of the accompanying drawings, in which.

Figure 1:
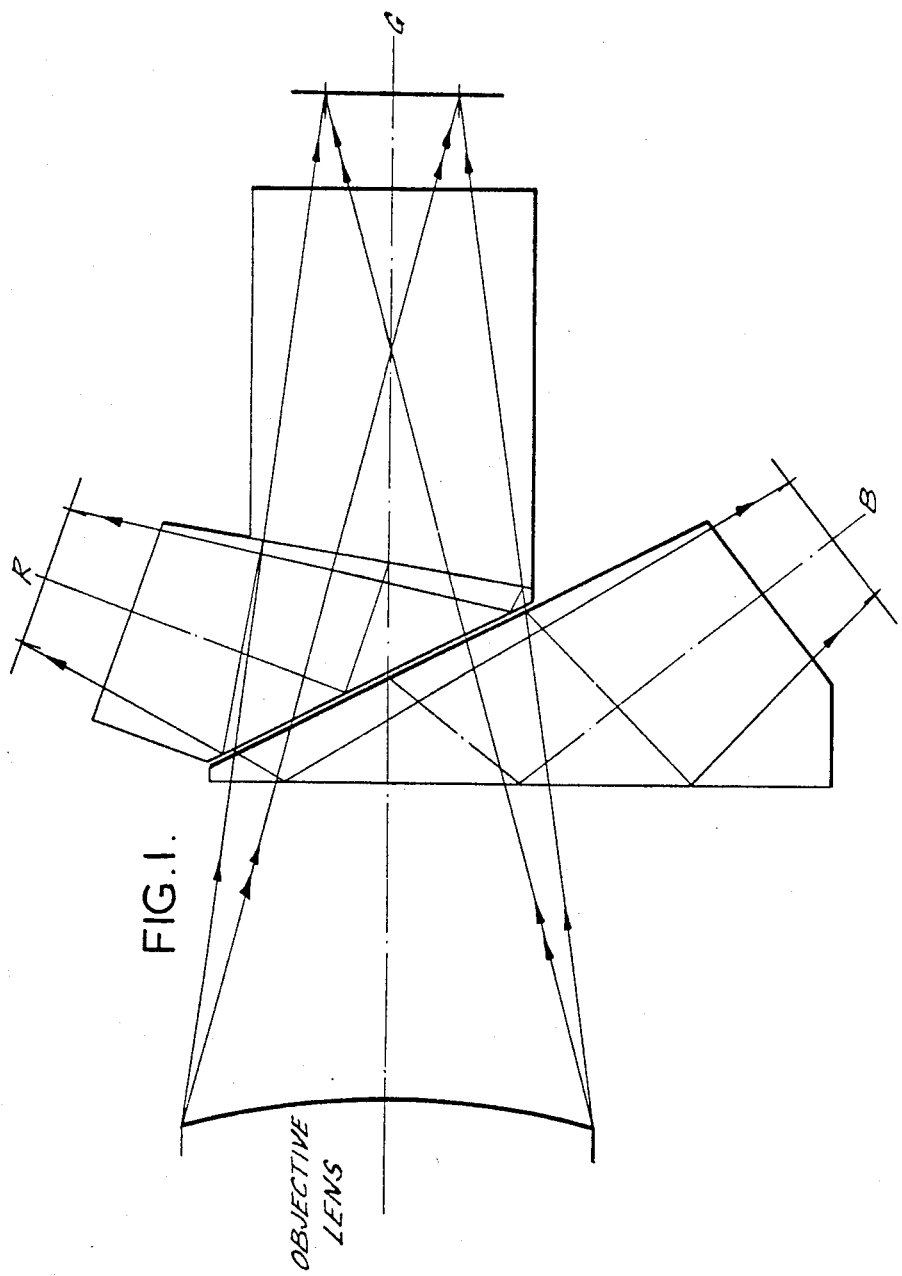
Figure 2:
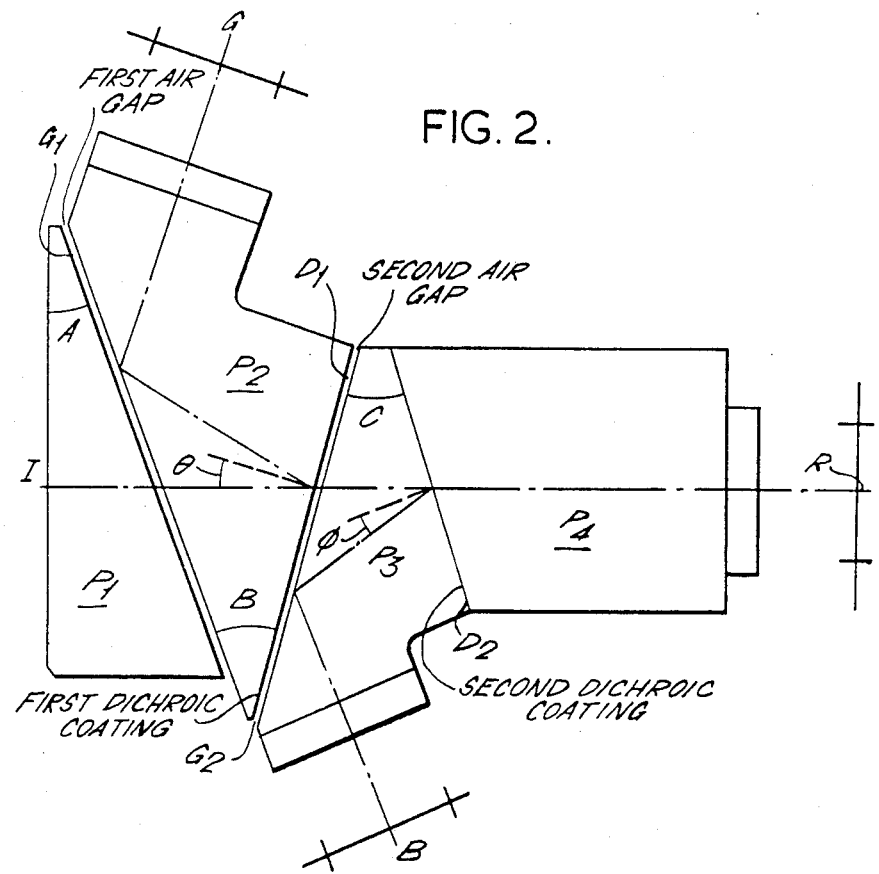
FIG. 2 shows the geometrical construction of a beam splitting prism assembly according to one embodiment of the invention.
Figure 3:
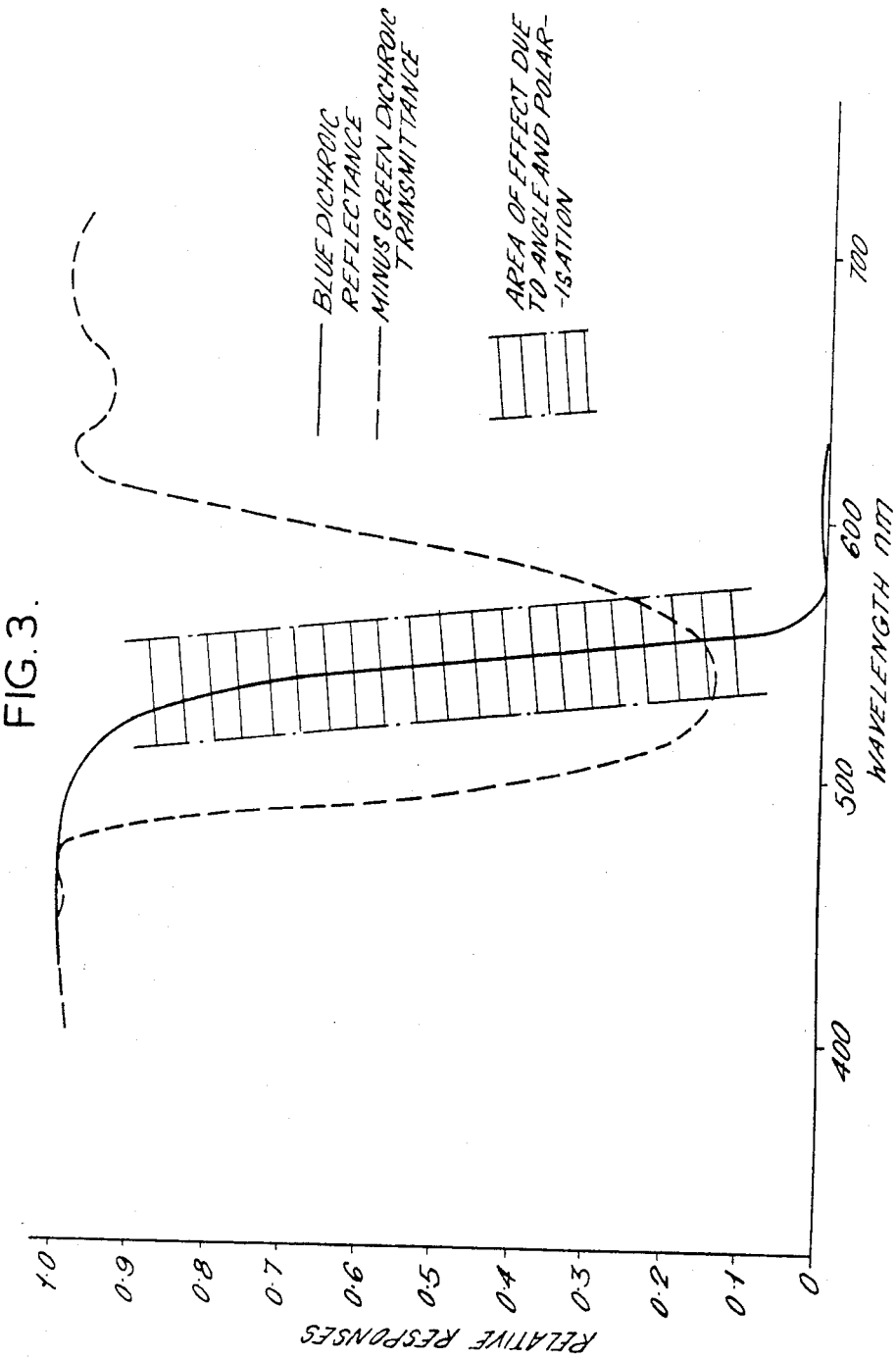
FIG. 3 shows how it is possible to separate the red and blue components by means of a dichroic spectral edge in the minus green region.

Referring to FIG. 2, the prism assembly of the illustrated embodiment of the invention consists of four prism elements $P_1$, $P_2$, $P_3$, $P_4$. The first three prism elements $P_1$, $P_2$, $P_3$ considered in the direction of incident light $I$ are arranged with their respective apex angles A, B, C on alternate sides of the optical axis of the assembly. The first and second prism elements $P_1$, $P_2$ have adjacent parallel surfaces defining a first air gap $G_1$, and the second and third prism elements $P_2$, $P_3$ have adjacent parallel surfaces defining a second air gap $G_2$, one of which latter surfaces has a first dichroic coating $D_1$. A second dichroic coating $D_2$ is provided on one of the adjoining surfaces of the third and fourth prism elements $P_3$, $P_4$.

The incident beam $I$ is split by the prism assembly into three colour components which form three differently coloured primary images at three separate detectors, indicated diagrammatically at G, B and R.

Figure 4:
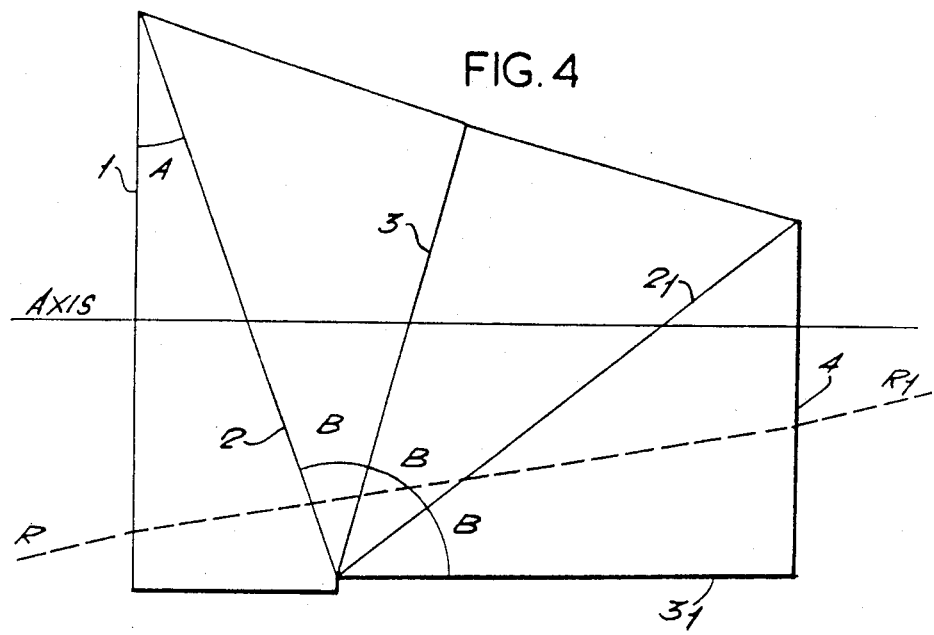
FIG. 4 shows the unfolded optical path followed by the first colour component reflected at the first dichroic surface of the prism assembly of FIG. 2.

Referring to FIG. 4, surface 1 is the entrance face of the first prism element $P_1$, 2 represents the pair of parallel surfaces defining the first air gap $G_1$ between the first and second prism elements $P_1$, $P_2$, and 3 represents the first dichroic surface $D_1$.

Surface $2_1$ is the mirror image of surface 2 in surface 3 and surface $3_1$ is the mirror image of surface 3 in surface $2_1$.

Surface 4 is the mirror image of the exit face of the prism assembly in this channel.

R $R_1$ represents the significant edge of the envelope of image forming light proceeding from a camera objective in front of surface 1 to an image format behind surface 4.

The apex angles of the first and second prism elements $P_1$, $P_2$ are shown as A and B respectively.

Figure 5:
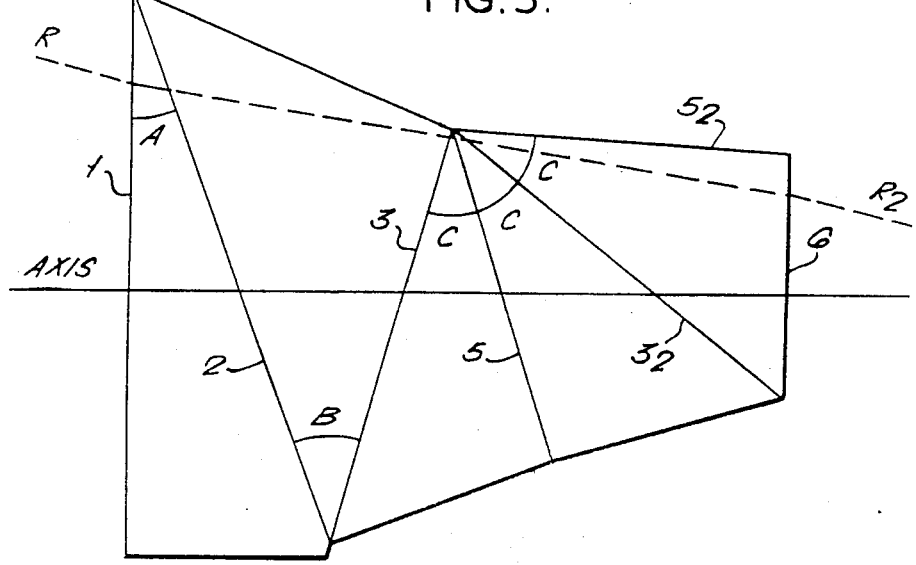
FIG. 5 shows the unfolded optical path followed by the second colour component reflected at the second dichroic surface of the prism assembly of FIG. 2.

FIG. 5 shows the unfolded optical path followed by the second colour component reflected at the second dichroic surface $D_2$. In FIG. 5, 1 represents the entrance face of the first prism element $P_1$, 2 represents the pair of parallel surfaces defining the first air gap $G_1$ between the first and second prism elements $P_1$, $P_2$, and 3 represents the pair of surfaces defining the second air gap $G_2$ between the second and third prism elements $P_2$, $P_3$, 5 represents the second dichroic surface $D_2$.

Surface $3_2$ is the mirror image of surface 3 in surface 5 and surface $5_2$ is the mirror image of surface 5 in surface $3_2$.

Surface 6 is the mirror image of the exit face of the prism assembly in this channel.

R $R_2$ represents the significant edge of the envelope of image forming light proceeding from a camera objective in front of surface 1 to an image format behind surface 6.

The apex angles of the first, second and third prism elements $P_1$, $P_2$, $P_3$ are shown as A, B and C respectively.

Since some surfaces of the assembly necessarily operate in dual modes of reflectance and transmittance, the law of critical angle of reflectance is an important factor in the geometry of layout.

The law of refraction can be expressed as:
$$N \sin I = N^1 \sin I^1$$
where $I$ is the angle of incidence between a ray and a normal to the surface in a medium of refractive index $N$ and $I^1$ is the angle in the other bounding medium of refractive index $N^1$.

Since $N^1$ is unity for an air medium it follows that no refraction can occur when $N \sin I$ exceeds unity and the ray is totally reflected instead.

The limiting critical angle can be expressed as $$\sin^{-1} \left(\frac{1}{N}\right)$$

It will be understood that this expression is not sufficient in itself to define the prism assembly geometry that is required because the laws of critical angle must be related to all directions of the image forming light and not to the optical axis alone.

In practice the assembly described is intended to be used in conjunction with a number of different camera objectives of the zoom lens type. Characteristics of zoom lens constructions, particularly those with back focal distances large enough to accommodate the prism assembly, are such that their exit pupils are positioned at a remote distance from their image plane. This fact coupled with other fundamental characteristics of vignetting sets conditions in which the maximum inclination of any incident ray forming any point in the image does not exceed the value $$\sin^{-1}\left(\frac{1}{2f_o}\right)$$

where $f_o$ is the $f$ number or relative aperture of the axial beam. The corresponding angle inside the denser glass material is $$\sin^{-1}\left(\frac{1}{2f_o N}\right).$$

When critical angle reflection is required for all image forming light, it follows that the angle of incidence for the optical axis in glass must exceed $$\sin^{-1}\left(\frac{1}{N}\right) + \sin^{-1}\left(\frac{1}{2f_o N}\right)$$

When critical angle reflection is to be avoided to ensure transmission for all image forming light, it follows that the angle of incidence for the optical axis in glass must not exceed $$\sin^{-1}\left(\frac{1}{N}\right) - \sin^{-1}\left(\frac{1}{2f_o N}\right)$$

With reference to FIG. 4 it will be obvious that the angle A cannot exceed $$\sin^{-1}\left(\frac{1}{N}\right) - \sin^{-1}\left(\frac{1}{2f_o N}\right)$$

and that $2B - A$ must equal or exceed $$\sin^{-1}\left(\frac{1}{N}\right) + \sin^{-1}\left(\frac{1}{2f_o N}\right).$$

Similarly in FIG. 5, $2C - B + A$ must equal or exceed $$\sin^{-1}\left(\frac{1}{N}\right) + \sin^{-1}\left(\frac{1}{2f_o N}\right).$$

In order to achieve other geometrical requirements such as a short glass path length relative to prism aperture it is desirable to choose near minimum limit values for the angles B and C but care must be taken to avoid the possibility of unwanted ghost images arising from reflections in surfaces making small angles with the image forming beams of light.

For example in FIG. 4 it is desirable to ensure that surface $3_1$ does not converge onto the beam edge R $R_1$. This can be achieved by ensuring that $3B - A$ is approximately equal to 90°.

Similarly in FIG. 5 it is desirable to ensure that surface $5_2$ does not converge on to the beam edge R $R_2$ and consequently $3C - B + A$ should approximate to 90°.

It will be evident that although each individual design parameter can lie within quite broad limits, the interdependancies between parameters are complex and numerous.

It has been found that the only solutions fulfilling all the objects of the invention must conform to these interdependancies and will therefore lie within much narrower limits. These can be defined as follows:

$$\frac{6\left[\sin^{-1}\left(\frac{1}{N}\right) + \sin^{-1}\left(\frac{1}{2f_o N}\right)\right]}{5} > (2B-A) \geq \left[\sin^{-1}\left(\frac{1}{N}\right) + \sin^{-1}\left(\frac{1}{2f_o N}\right)\right] \quad 1$$

$$\frac{6\left[\sin^{-1}\left(\frac{1}{N}\right) + \sin^{-1}\left(\frac{1}{2f_o N}\right)\right]}{5} > (2C-B+A) \geq \left[\sin^{-1}\left(\frac{1}{N}\right) + \sin^{-1}\left(\frac{1}{2f_o N}\right)\right] \quad 2$$

$$\frac{5\left[\sin^{-1}\left(\frac{1}{N}\right) - \sin^{-1}\left(\frac{1}{2f_o N}\right)\right]}{6} > A > \frac{\left[\sin^{-1}\left(\frac{1}{N}\right) + \sin^{-1}\left(\frac{1}{2f_o N}\right)\right]}{3} \quad 3$$

$$\frac{4\left[\sin^{-1}\left(\frac{1}{N}\right) - \sin^{-1}\left(\frac{1}{2f_o N}\right)\right]}{3} \geq B > \frac{\left[2\sin^{-1}\left(\frac{1}{N}\right) + \sin^{-1}\left(\frac{1}{2f_o N}\right)\right]}{3} \quad 4$$

$$\frac{5\left[\sin^{-1}\left(\frac{1}{N}\right) - \sin^{-1}\left(\frac{1}{2f_o N}\right)\right]}{4} \geq C > \frac{5\left[\sin^{-1}\left(\frac{1}{N}\right) + \sin^{-1}\left(\frac{1}{2f_o N}\right)\right]}{8} \quad 5$$

Regardless of the values of parameters within the above limits, the following exact relationships always apply:
$$\theta = B - A$$
$$\phi = A + C - B$$
where $\theta$ is the axial angle of incidence at the first dichroic surface and $\phi$ is the angle at the second.

By the way of example FIG. 2 shows an arrangement whose parameters fall within the described narrow limits and which fulfils the objects of the invention.

The first surface of the first prism element is normal to the incident optical axis. The second surface is followed by the first surface of the second prism and spaced from it by a thin parallel air gap to provide the necessary conditions for reflection of the green component reflected from the first dichroic mirror which is carried on the second surface of the second prism element.

The second surface of the second prism is followed by the first surface of the third prism element and spaced from it by a thin parallel air gap to provide the necessary conditions for reflection of the blue component reflected from the second dichroic mirror which is carried on the second surface of the third prism element.

The second surface of the third prism is followed by the first surface of the fourth prism element either cemented to it or spaced from it by a thin parallel air space. The second surface of the fourth prism is normal to the undeviated red optical axis.

The third surfaces of the second and third prism elements are normal to the optical axes after two reflections of each of the first and second colour components.

Two examples of prism assemblies according to the invention are given below:

EXAMPLE I: Construction data $A = 20°30'$
$B = 36°20'$
$C = 33°50'$
$\theta = 15°50'$
$\phi = 18°00'$
Glass material

| wavelength | $N$ | $\sin^{-1}(\frac{1}{N})$ |
|---|---|---|
| 546.1 nm | 1.5187 | 41°10' |
| 435.8 nm | 1.5267 | 40°55' |
| 643.8 nm | 1.5147 | 41°20' |

Maximum Objective relative aperture accepted F/1.73

| wavelength | $\sin^{-1}(\frac{1}{2f_oN})$ |
|---|---|
| 546.1 | 11°00' |
| 435.8 | 10°55' |

Maximum aperture of first surface of first prism element measured in the plane containing all the emergent axes: 38.0 mm Glass path length including trimming filters: 63.4 mm all three channels Image format covered measured in the plane containing all emergent axes: 12.8 mm Example I shows how some of the basic elements of a four element prism can be compounded by the addition of trimming filter without departing from the invention and its limits. More complex arrangements such as those disclosed in our co-pending U.K. patent application No. 43280/72 also fall within the scope of this invention.

Example I falls within the limits of the five inequalities defined above in the following manner.

| Equation | | |
|---|---|---|
| 1 | 62°36'>52°10'≧ | 52°10' |
| 2 | 62°12'>51°50'≧ | 51°50' |
| 3 | 25°8' >20°30'> | 17°23' |
| 4 | 40°13'>36°20'> | 34°46' |
| 5 | 37°30'>33°50'> | 32°24' |

Note that the outer limits for equations 1 and 4 are computed with respect to refractive index at 546.1 nm; that outer limits for equations 2 and 5 are computed with respect to refractive index at 435.8 nm; and that this distinction is not necessary for equation 3 where the angle A is common to all channels.

EXAMPLE II

Glass material:

| wavelength | $N$ | $\sin^{-1}(\frac{1}{N})$ |
|---|---|---|
| 546.1 | 1.6430 | 37°30' |
| 435.8 | 1.6537 | 37°12' |
| 643.8 | 1.6378 | 37°38' |

Assuming that the camera objective relative aperture is the same as in Example I:

| wavelength | $\sin^{-1}(\frac{1}{2f_oN})$ |
|---|---|
| 546.1 | 10°8' |
| 435.8 | 10°4' |

Considering first the conditions in the first (green) channel G, it is well known that sensitivity to polarisation and colour shading is a function of the equivalent angle of incidence in air rather than the angle $\theta$ in glass. In a glass having a refractive index of 1.64 it is therefore desirable to reduce $\theta$ from 15°50' to 14°36' to maintain the same angle refracted out into the air.
Thus $\theta = B - A = \mathbf{14°36'}$ To minimise the possibility of a ghost image when B is small (3B−A) should approach 90°. Consequently B is chosen to lie on its upper limit, viz: $B = 36°30'$ $A = 21°54'$ giving $3B - A = 87°36'$ In the remaining red and blue channels the angle C must be selected to lie on its upper limit to minimise the ghost image hazard. Thus:
$C = \mathbf{33°55'}$
$\phi = 21°54' + 33°55' - 36°30' = 19°19'$ giving $3C - B + A = 87°09'$, which is as far from 90° as an acceptable ghost hazard permits.

The constructional data of the prism assembly of Example II may therefore be summarised as follows:
$A = 21°54'$
$B = 36°30'$
$C = 33°55'$
$\theta\ 32\ 14°36'$
$\phi = 19°19'$ Example II falls within the limits of the five inequalities (1)–(5), as follows:

| Equation | | | |
|---|---|---|---|
| 1 | 57°10'> | 51°06'> | 47°38' |
| 2 | 56°43'> | 53°14'> | 47°16' |
| 3 | 22°48'> | 21°54'> | 15°53' |
| 4 | 36°30'≧ | 36°30'> | 31°46' |
| 5 | 33°55'≧ | 33°55'> | 29°33' |

It can be concluded that the construction of the invention is not sensitive to changes of refractive index, since the two examples given use glasses of very different refractive indices, yet the resultant geometry and colorimetric performance of the two prisms are essentially similar.

What is claimed is:

1. A beam splitting prism assembly comprising first, second, third and fourth prism elements arranged consecutively to separate incident light spatially into three different spectral components wherein the first component lies spectrally between the other two components wherein the improvement consists in said first and second prism elements considered in the direction of incident light having adjacent parallel and spectrally substantially non-selective surfaces defining a first air gap, said second and third prism elements being separated by a second air gap, a spectrally selective dichroic coated surface and a spectrally substantially non-selective surface, parallel to said coated surface, bounding said second air gap, one of the adjacent surfaces of the third and fourth prism elements carrying a spectrally selective second dichroic coating, wherein the surfaces defining the first and second air gaps are inclined to the direction of incident light to transmit said incident light and to totally internally reflect the light which has been selectively reflected from the corresponding dichroic surface, and wherein the apex angles of the said first, second and third prism elements lie within the following limits:

$$\frac{6\left[\sin^{-1}\left(\frac{1}{N}\right) + \sin^{-1}\left(\frac{1}{2f_oN}\right)\right]}{5} > (2B-A) \geq \left[\sin^{-1}\left(\frac{1}{N}\right) + \sin^{-1}\left(\frac{1}{2f_oN}\right)\right]$$

$$\frac{6\left[\sin^{-1}\left(\frac{1}{N}\right) + \sin^{-1}\left(\frac{1}{2f_oN}\right)\right]}{5} > (2C-B+A) \geq \left[\sin^{-1}\left(\frac{1}{N}\right) + \sin^{-1}\left(\frac{1}{2f_oN}\right)\right]$$

$$\frac{5\left[\sin^{-1}\left(\frac{1}{N}\right) - \sin^{-1}\left(\frac{1}{2f_oN}\right)\right]}{6} > A > \frac{\left[\sin^{-1}\left(\frac{1}{N}\right) + \sin^{-1}\left(\frac{1}{2f_oN}\right)\right]}{3}$$

$$\frac{4\left[\sin^{-1}\left(\frac{1}{N}\right) - \sin^{-1}\left(\frac{1}{2f_oN}\right)\right]}{3} \geq B > \frac{2\left[\sin^{-1}\left(\frac{1}{N}\right) + \sin^{-1}\left(\frac{1}{2f_oN}\right)\right]}{3}$$

$$\frac{5\left[\sin^{-1}\left(\frac{1}{N}\right) - \sin^{-1}\left(\frac{1}{2f_oN}\right)\right]}{4} \geq C > \frac{5\left[\sin^{-1}\left(\frac{1}{N}\right) + \sin^{-1}\left(\frac{1}{2f_oN}\right)\right]}{8}$$

where:
- $A$ is the apex angle of the first prism element;
- $B$ is the apex angle of the second prism element;
- $C$ is the apex angle of the third prism element;
- $N$ is the refractive index of the prism glass at the wavelength appropriate to the colour being selected, and
- $f_o$ is the widest relative aperture of camera objective with which the assembly is optically compatible.

2. The beam splitting prism assembly defined in claim 1, wherein the second surface of the third prism carries a spectrally selective dichroic coating to which the fourth prism element is cemented.

3. The beam splitting prism assembly defined in claim 1 wherein the first surface of the fourth prism element carries a spectrally selective dichroic coating to which the third prism element is cemented.

4. The beam splitting prism assembly defined in claim 1 wherein the third and fourth prism elements are separated from each other to define a further parallel air gap bounded by one spectrally selective dichroic and one substantially non-selective surface.

5. The beam splitting prism assembly defined in claim 1, wherein the first colour component selectively separated by reflection is green, the second by reflection is red and the third by transmission is blue.

* * * * *